United States Patent [19]

Joseph et al.

[11] Patent Number: 4,805,675

[45] Date of Patent: Feb. 21, 1989

[54] VALVES FOR CHEMICAL CONTAINERS

[75] Inventors: Frank Joseph, Gernsheim; Helmuth Krauss, Heppenheim; Peter Müller, Darmstadt; Klaus Kreher, Münster, all of Fed. Rep. of Germany

[73] Assignee: Merck Patent Gesellschaft MIT Beschränkter Haftung, Darmstadt, Fed. Rep. of Germany

[21] Appl. No.: 873,006

[22] Filed: Jun. 11, 1986

[30] Foreign Application Priority Data

Jun. 11, 1985 [DE] Fed. Rep. of Germany ....... 3520795

[51] Int. Cl.4 ................................................ B65B 3/04
[52] U.S. Cl. .................. 141/302; 137/625.17; 251/325
[58] Field of Search ............... 137/205, 212, 312, 583, 137/588, 590, 592, 625.17, 625.18, 625.38, 625.48, 625.68, 625.69; 141/5, 290, 302, 305; 222/108, 152, 188, 373, 375, 399, 400.7, 630; 251/325; 277/3

[56] References Cited

U.S. PATENT DOCUMENTS 2,333,036 10/1943 Orndorff ........................ 251/325 X
3,272,404 9/1966 Graves, et al. ............... 222/400.7 X
3,511,273 5/1970 Bartholomäus ............ 137/625.17 X

FOREIGN PATENT DOCUMENTS 1078126 11/1954 France ............................... 251/325

Primary Examiner—Werner H. Schroeder
Attorney, Agent, or Firm—Millen & White

[57] ABSTRACT

A sliding valve for withdrawing liquid or gaseous chemical products from a container has a cylindrical valve spool which slides axially in a bore through a valve housing. A first annular groove of the valve spool connects, in the open position of the valve, a product supply line to a product withdrawal line. On one side of this first annular groove there is a second annular groove which, in the open position, connects a gas supply line to a gas withdrawal line. An annular groove on the other side is connected to the second annular groove. By this arrangement, protective gas is admitted to the valve spaces on either side of the first annular groove, which handles the product, with the result that escape of the product to the outside, or penetration of impurities, are positively prevented.

8 Claims, 1 Drawing Sheet

VALVES FOR CHEMICAL CONTAINERS

BACKGROUND OF THE INVENTION (1) Field of the invention:

The invention relates to valves for chamical containers wherein the valves are used for withdrawing liquid or gaseous chemical products from the containers while at the same time supplying a protective gas thereto.

(2) Technical consideration and prior art:

The substances required for the manufacture of semiconductors are predominantly toxic and/or aggressive. Accordingly, impurities in the containers which are used for the storage and transport of these substances, and/or in connected doping and epitaxial plants, can lead to considerable problems in processing procedures and must therefore be excluded. For such applications, valves comprising valve housings with bores therethrough are connected to inlet and outlet ports and controlled by valve spools are used. With such arrangements a protective gas, such as an inert gas, is used to transport the liquid or gaseous products to be withdrawn and in most cases is also used for flushing the connected lines after a withdrawal.

In fiber optic technology, acid chlorides are despatched from and stored in glass containers or, particularly for silicon tetrachloride, stainless steel vessels are used. While steel ball valves are normally used for the stainless steel vessels; for glass vessels, plug valves are used which certainly offer the possibility of flushing with a protective gas, but which often do not achieve adequate sealing on account of relatively low surface pressure at the valve. Other glass and/or PTFE valves are also used for applications of this type.

OBJECT OF THE INVENTION

The object of the invention is to provide a valve of the type referred to which achieves complete sealing with a simple and compact construction.

Upon further study of the specification and appended claims, further objects and advantages of this invention will become apparent to those skilled in the art.

SUMMARY OF THE INVENTION

The aforementioned object is achieved in accordance with the invention when the valve is a sliding valve having a cylindrical valve spool which can move axially in a bore through the valve housing. The valve spool has a first annular groove which, in the open position of the valve, connects the product supply line to the product withdrawal line. The valve spool also has a second annular groove which, in the open position of the valve, connects the gas supply line to the gas withdrawal line. On the opposite side of the first annular groove with respect to the second annular groove, there is a third annular groove which is connected to the second annular groove by a central bore in the valve spool. The third annular groove is also supplied with inert gas having an overpressure equal to the pressure within the annular groove handling the chemicals and encloses the inert gas preventing contamination from outside the container or leaks to the outside of the container. All annular grooves (14, 15, 19) are sealed axially by sealing rings (20).

The arrangement, on either side of the annular groove handling the product to be withdrawn, wherein the two annular grooves to which protective gas is admitted positively, prevents traces of the product from being able to escape or impurities from being able to penetrate from outside into the ducts handling the product. The protective gas by means of which the product is conveyed out of the container remains at the same pressure as the product, with the result that there is no internal overpressure at the sealing surfaces to isolate the product which could cause the product to escape.

The construction of the movable valve body as a valve spool makes it possible to perform, in the smallest possible space next to each other, the valve control functions which are required, on the one hand, for withdrawal of the product from the container, and on the other hand, for simultaneous supply of the protective gas which is used at the same time to achieve a substantial improvement of the sealing effect.

In accordance with one embodiment of the inventive concept, it is arranged that in the closed position of the valve, the third annular groove is connected to the product withdrawal line. This achieves a flushing facility in a manner which is structurally very simple, i.e., it makes it possible to flush the valve system. The protective gas supplies, preferably an inert gas, flows through the gas line into the second annular groove which is on one side of the first annular groove which handles the product, from there into the product withdrawal line. Thus, in the closed position of the valve all these ducts are flushed by the protective gas.

BRIEF DESCRIPTION OF THE DRAWINGS

The invention is explained in greater detail below with the aid of an example of the design whichis shown in the drawings in which.

DESCRIPTION OF THE PREFERRED EMBODIMENT

Figure 1:
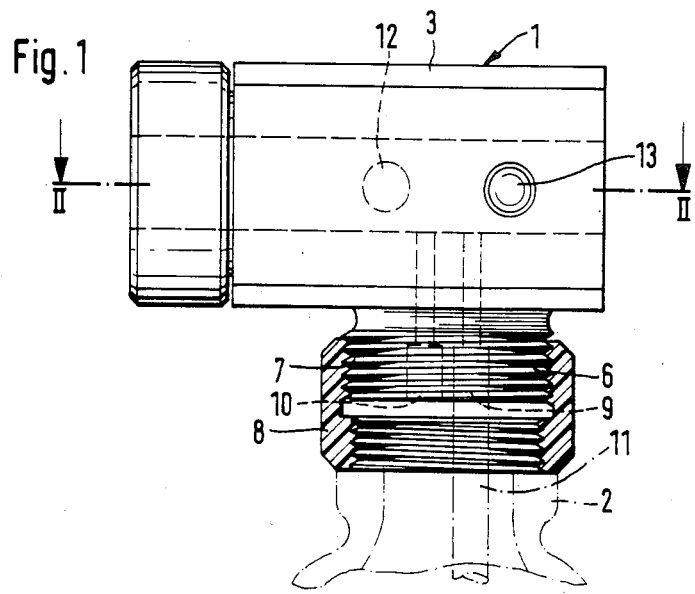
FIG. 1 shows a side view of a valve for a chemical container.

The valve 1 shown in the drawing is used for withdrawing chemically aggressive and highly purity chemicals in liquid form or in gaseous form from a container 2, which container is only partially indicated in FIG. 1 by dash-and-dot lines. The valve 1 has a valve housing 3 with a central boring 4 in which is contained an axially-movable cylindrical valve spool 5.

On the under side of the valve housing 3 there is a connection branch 6 which has an external thread 7 carrying a union nut 8 which forms the connection with the container 2. The union nut 8 has an upper threaded section with a left-handed thread and a lower threaded section with a righ-handed thread. The right-left screw coupling so formed makes it possible to position the valve 1 positively on the container 2.

A product supply line 9 and a gas withdrawal line 10, arranged axially adjacent to each other, terminate at the front face of the connection branch 6, each having a thread into which, as selected, can be screwed a diptube 11, indicated in FIG. 1 by dash-and-dot lines, which dip-tube dips into the liquid contained in container 2. The product supply line 9 provides a product inlet port while the gas withdrawal line 10 provides a gas outlet port.

Figure 2:
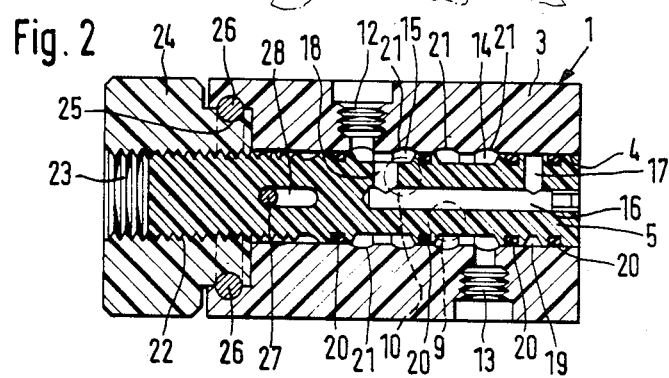
FIG. 2 shows a section along line II—II of FIG. 1 with the valve in the open position.

A gas supply line 12 and a product withdrawal line 13 terminate horizontally in the boring 4 of the valve housing 3, one on each side of the terminations of the product withdrawal line 9 and the gas supply line 10. The gas supply line 12 provides a gas inlet port while the product withdrawal line 13 provides a product outlet port. The valve spool 5 has a first annular groove 14 which in the open position of the valve 1 (FIG. 2), connects the product withdrawal line 9 to the product withdrawal line 13. On one side of the first annular groove 14, there is a second annular groove 15 which, in the open position of the valve 1 (FIG. 2), connects the gas supply line 12 to the gas withdrawal line 10 discharging into the container 2. In the example shown, the dip-tube 11 is screwed into the product withdrawal line 9 so, displaced by the inert gas or other protective gas supplied, the liquid product rises in the dip-tube 11 and passes into the product withdrawal line 13. If, on the other hand, the dip-tube 11 were screwed into the gas supply line 10, the bubbles of the gas supplied would then rise up in the liquid product and the gaseous or vapour-state product would pass out into the product withdrawal line 13 through the product withdrawal line 9. This withdrawal process is referred to as "bubbling".

A third annular groove 19, which is on the opposite side of the first annular groove 14 to the second annular groove 15, is linked to the second annular groove 15 by a central boring 16 and short, radial borings 17 and 18. The two annular grooves 15, 19 placed on either side of the annular groove 14, which handles the product, are therefore supplied with protective gas and prevent sideways escape of the product.

All the annular grooves 14, 15, and 19 are sealed axially by sealing rings 20 which for preference are in the form of O-rings. In the region of each of the discharge points of the supply and withdrawal lines 9, 10, 12, and 13, the boring 4 of the valve housing 3 has a shallow circumferential groove 21. This reduces the friction of the sealing rings 20 during the movement of the valve spool 5 between its two end positions.

The end of the valve spool 5 has an external thread 22 which is engaged in the internal thread 23 of an actuating nut 24 which nut is fixed in the valve housing 3 so that the spool can be rotated but not moved axially. For this purpose a shoulder of the actuating nut 24 has a circumferential groove 25 which engages the pegs 26 which are inserted into the valve housing 3.

A traverse peg 27, which is positioned in the valve housing 3, projects through an elongated slot 28 in the valve spool 5. This prevents the valve spool 5 from rotating. The length of the elongated slot 28 limits the axial movement of the valve spool 5.

Figure 3:
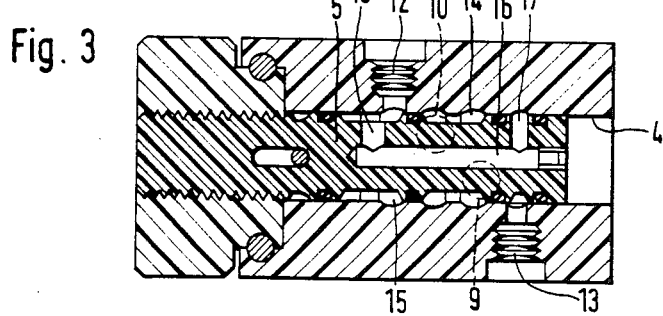
FIG. 3 shows a section along line II—II of FIG. 1 with the valve in the closed position.

By rotating the actuating nut 24, the valve spool 5 is advanced to the closed position of the valve shown in FIG. 3. In this closed position of the valve, the first annular groove 14 overlaps the product supply line 9 and the gas withdrawal line 10, i.e. the two lines 9 and 10 connected to the container 2 are joined together, but are isolated from the outside. In this position, the third annular groove 19 is above the product withdrawal line 13, making a direct gas connection from the gas supply line 12 via the annular groove 15, the central boring 16, the annular groove 19 and the product withdrawal line 13. In this way these channels can be flushed with the protective gas.

Just as in the open position of the valve, the valve spaces on both sides of the discharge points of lines 9 and 10 are also supplied with protective gas in the closed position of the valve and are thus enclosed against contamination from the outside or leaks to the outside. This function of the valve is ensured during both the withdrawal of liquid and the withdrawal of gas or vapour by the alternative placement of the dip-tube 11 on the line 9 or 10.

For preference all the valve components are made from chemically-resistant synthetic materials such as PFTE and/or PVDF.

From the foregoing description, one skilled in the art can easily ascertain the essential characteristics of this invention, and without departing from the spirit and scope thereof, can make various changes and modifications of the invention to adapt it to various usages and conditions.

We claim:

1. A valve for connection to a source of product in the form of a container having liquid or gaseous products therein, which products are displaced by and protected by a source of inert gas, the valve comprising:

a housing, the housing having a bore defining a circular wall and having first and second product ports and first and second inert gas ports, the ports communicating with the bore; the first inert gas and first product ports communicating with the sources of the gas and product, respectively, the second inert gas and second product ports respectively supplying gas to and dispensing product from the container, a valve spool slidably received within the bore, the valve spool having a surface with first, second, and third annular grooves therein, distributed axially therealong, a passageway within the spool connecting the second annular groove to the third annular groove, the first annular groove being disposed between the second and third annular grooves;

means for axially moving the spool between a first position and a second position wherein when the spool is in the first position the first annular groove aligns with the first and second product ports while the second annular groove aligns with the first and second gas ports, the third annular groove being out of communication with the first product port but in communication with the first gas port allowing the product to be pressurized by the inert gas so as to flow from the container while the passageway in the spool is filled with inert gas, and wherein when the spool is in the second position the second annular groove remains in alignment with the first gas port while being out of alignment with the second gas port whereby the inert gas flushes the valve when the spool is in the second position while the first annular groove is out of alignment with the second product port preventing the product from leaving the container.

2. A valve according to claim 1, wherein there is a gas supply tube and a product supply tube arranged axially adjacent to one another which terminate in a common container connection, the product supply tube having a thread for connection to a dip tube for extension down into a container for the product.

3. A valve according to claim 1 wherein there are shallow circumferential groove means positioned in the circular wall for establishing communication with the bore.

4. Valve according to claim 1, characterized in that the sealing rings (20) are O-rings.

5. The valve of claim 1 further including O-ring sealing means around the spool at axially spaced locations to isolate the annular grooves from one another.

6. The valve of claim 5 wherein each of the ports are axially spaced from one another along the bore.

7. The valve of claim 6 wherein the means for moving the valve spool comprises: means for restraining the spool from rotation and helical threads on the spool; a threaded actuator mounted for rotation adjacent the bore and cooperating with the helical threads on the spool, whereby as the actuator rotates the spool axially moves in the bore.

8. The valve of claim 1 wherein the valve is made of a synthetic material which is chemically-resistant to the products being dispensed.

* * * * *